United States Patent Office 3,028,378
Patented Apr. 3, 1962

3,028,378
PHARMACOLOGICALLY ACTIVE COMPOUNDS
Emilio Testa, Vacallo, Ticino, Switzerland, and Luigi Fontanella and Giulio Maffii, Milan, Italy, assignors to Lepetit S.p.A., Milan, Italy
No Drawing. Filed Dec. 18, 1959, Ser. No. 860,313
Claims priority, application Great Britain Dec. 23, 1958
6 Claims. (Cl. 260—239)

This invention is concerned with new pharmacologically active compounds. More particularly the invention is concerned with 3-substituted 1-hydroxyalkylazetidines and their acyl derivatives of the formula

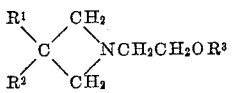

wherein $R^1$ represents hydrogen, lower alkyl, cycloalkyl, aryl and aralkyl radicals, $R^2$ represents lower akyl, cycloalkyl, aryl or aralkyl radicals and $R^3$ represents hydrogen or an acyl radical.

The compounds of the invention have been found to possess a considerable hypotensive activity.

The process of the invention consists in reacting a 3-substituted azetidine of the formula

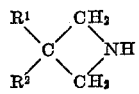

wherein $R^1$ and $R^2$ have the above significance, with ethylene oxide in an inert anhydrous organic solvent at room temperature, and if desired acylating the formed N-hydroxyethylazetidine by conventional methods.

The starting materials, i.e., 3-substituted azetidines, are prepared by bringing together a 2-azetidinone of the formula:

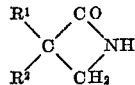

with lithium aluminium hydride in a molar ratio of 1 to about 0.8–1.5 in an anhydrous inert organic solvent such as diethylether or tetrahydrofuran, as described in our copending application Serial No. 860,311, filed simultaneously herewith. The preparation of the 2-azetidinones is disclosed by E. Testa and L. Fontanella, "Zur Synthese der 3,3-disubstituierten Azetidinone-(2)," Liebigs Am. Chem. 625, 95–98 (1959), and by E. Testa, L. Fontanella, G. F. Christiani and F. Fava, "Weitere Untersuchungen über 3,3-disubstituierten Azetidinone-(2)," Liebigs Am. Chem. 614, 158–66 (1958).

The following examples are illustrative of the invention.

Example 1

*3-phenyl-3-ethyl-1-(β-hydroxyethyl) - azetidine.*—To a solution of 30 g. of ethylene oxide in 250 ml. of anhydrous ethanol, a solution of 100 g. of 3-phenyl-3-ethylazetidine in 50 ml. of anhydrous ethanol is slowly added with stirring. After 3 days at room temperature the solvent is removed and the residue distilled. B.P. 100–105°/0.4 mm.; yield 90 g. (72%).

Example 2

*3,3-diethyl-1-(β-hydroxyethyl)-azetidine.*—To a solution of 30 g. of ethylene oxide in 250 ml. of anhydrous ethanol, a solution of 70 g. of 3,3-diethylazetidine in 100 ml. of anhydrous ethanol is slowly added with stirring. After 2 days at room temperature the solvent is removed and the residue distilled. B.P. 73–75°/0.6–0.8 mm.; yield 80 g. (82%).

Example 3

*3-phenyl-3-ethyl-1-(β-benzoyloxymethyl) - azetidine.*— To a solution of 41.5 g. of 3-phenyl-3-ethyl-1-(β-hydroxyethyl)-azetidine, 14 g. of benzoyl chloride are slowly added with stirring. After addition of water, the mixture is neutralized with sodium carbonate and extracted with diethyl ether. The solvent is then removed and the residue distilled. Yield 55 g. (87%); B.P. 160–170°/0.3 mm.

Example 4

*3-phenyl-3-methyl-1 - (β - hydroxyethyl)-azetidine.*— This compound, prepared according to the process of Example 1 has B.P. 107–110°/0.1 mm.; yield 68%.

Example 5

*3-phenyl-3-n-propyl-1-(β-hydroxyethyl) - azetidine.*— Prepared as described in Example 1. B.P. 110–120°/0.2 mm.; yield 79%.

Examples 6 to 9

According to the process of Example 1 the following 1-(β-hydroxyethyl)-azetidines are prepared. Yields (y.) and boiling points (B.P.) are given.

3-phenyl-3-iso-propyl_____ y. 77%, B.P. 110–120°/0.2–0.4 mm.
3,3-dimethyl_____ y. 68%, B.P. 80–83°/22–24 mm.
3-phenyl-3-n-butyl_____ y. 88%, B.P. 125–130°/0.3–0.5 mm.
3-phenyl_____ y. 74%, B.P. 105–110°/0.8 mm.

We claim:
1. A compound of the formula

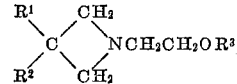

wherein $R^1$ is selected from the class consisting of hydrogen, lower alkyl, and phenyl, $R^2$ is selected from the class consisting of lower alkyl and phenyl, and $R^3$ is selected from the class consisting of hydrogen and benzoyl.
2. 3-phenyl-3-ethyl-1-(β-hydroxyethyl)-azetidine.
3. 3,3-diethyl-1-(β-hydroxyethyl)-azetidine.
4. 3-phenyl-3-ethyl-1-(β-benzoyloxyethyl)-azetidine.
5. 3-phenyl-3-n-propyl-1-(β-hydroxyethyl)-azetidine.
6. 3-phenyl-1-(β-hydroxyethyl)-azetidine

References Cited in the file of this patent

Chemical Abstracts, vol. 33, p. 4197 (1939).
Funke et al.: Bull. Soc. Chim. France, (1953), pp. 1021–23.